(12) United States Patent
Dyer et al.

(10) Patent No.: US 6,376,565 B1
(45) Date of Patent: Apr. 23, 2002

(54) IMPLEMENTS COMPRISING HIGHLY DURABLE FOAM MATERIALS DERIVED FROM HIGH INTERNAL PHASE EMULSIONS

(75) Inventors: John Collins Dyer; Thomas Charles Hortel; Robert Joseph McChain; Thomas Allen DesMarais; Gerald Alfred Young, all of Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/698,343

(22) Filed: Oct. 27, 2000

Related U.S. Application Data (60) Provisional application No. 60/163,064, filed on Nov. 2, 1999.

(51) Int. Cl.[7] .................................. C08J 9/28; C08J 9/40
(52) U.S. Cl. .............................. 521/64; 521/53; 521/54
(58) Field of Search ............................... 521/64, 53, 54

(56) References Cited

U.S. PATENT DOCUMENTS

| | | | |
|---|---|---|---|
| 3,256,219 A | 6/1966 | Will | 260/2.5 |
| 3,763,056 A | 10/1973 | Will | 260/2.5 |
| 4,522,953 A | 6/1985 | Barby et al. | 521/64 |
| 4,536,521 A | 8/1985 | Haq | 521/146 |
| 4,606,958 A | 8/1986 | Haq et al. | 428/68 |
| 4,659,564 A | 4/1987 | Cox et al. | 424/65 |
| 4,797,310 A | 1/1989 | Barby et al. | 428/71 |
| 4,966,919 A | 10/1990 | Williams, Jr. et al. | 521/54 |
| 5,021,462 A | 6/1991 | Elmes et al. | 521/63 |
| 5,571,849 A | 11/1996 | DesMarais | |
| 5,633,291 A | 5/1997 | Dyer et al. | 521/64 |
| 5,650,222 A | 7/1997 | Desmarais et al. | 442/370 |
| 5,728,743 A | 3/1998 | Dyer et al. | 521/64 |
| 5,753,359 A | 5/1998 | Dyer et al. | 428/315.5 |
| 5,770,634 A | 6/1998 | Dyer et al. | 521/64 |
| 5,817,704 A | 10/1998 | Shiveley et al. | 521/63 |
| 5,849,805 A | 12/1998 | Dyer | 521/64 |
| 6,160,028 A | 12/2000 | Dyer | 521/64 |

FOREIGN PATENT DOCUMENTS

| | | |
|---|---|---|
| WO | WO 97/37745 | 10/1997 |

*Primary Examiner*—Morton Foelak
(74) *Attorney, Agent, or Firm*—Edward J. Milbrada; Angela Marie Stone (57) ABSTRACT

Described are implements made from a durable HIPE foam material. The HIPE foam has a Toughness Index of at least 75 where the Toughness Index relates properties related to durability (e.g., density, tan[δ] height, glass transition temperature, and abrasion resistance) into a single composite descriptor thereof. Exemplary implements include: wipes, toys, stamps, art media, targets, food preparation implements, plant care implements, and medical wraps.

7 Claims, 1 Drawing Sheet

IMPLEMENTS COMPRISING HIGHLY DURABLE FOAM MATERIALS DERIVED FROM HIGH INTERNAL PHASE EMULSIONS

This APPLICATION CLAIMS THE BENEFIT OF U.S. PROVISIONAL APPLICATION No. 60/163,064 FILED Nov. 02, 1999.

FIELD OF THE INVENTION

This application relates to implements formed from certain open-celled foams made from high internal phase emulsions.

BACKGROUND OF THE INVENTION

The development of open-celled foams made from high internal phase emulsions, or HIPEs, has been the subject of substantial interest. These foams, termed HIPE foams hereinafter, have been cited for numerous potential uses. For example, U.S. Pat. No. 4,606,958 (Haq et al.) issued Aug. 19, 1986 describes an absorbent substrate such as a cloth or a towel prepared from a sulfonated styrenic HIPE foam for mopping up household spills. U.S. Pat. No. 4,536,521 (Haq) issued Aug. 20, 1985 describes similar HIPE foams which can act as ion exchange resins. U.S. Pat. No. 4,522,953 (Barby et al.) issued Jun. 11, 1985 describes use of HIPE foams as reservoirs for carrying liquids. U.S. Pat. No. 5,021,462 (Elmes et al.) issued Jun. 4, 1991 describes HIPE foams useful in a filter body, as a catalyst support, and as a containment system for toxic liquids. U.S. Pat. No. 4,659,564 (Cox et al.) issued Apr. 21, 1987 describes use of HIPE foams for absorbing axillary perspiration. U.S. Pat. No. 4,797,310 (Barby et al.) issued Jan. 10, 1989 describes HIPE foam substrates useful for delivering or absorbing liquids such as cleaning compositions. Other uses cited include hand and face cleaning, skin treatment other than cleaning, baby hygiene, cleaning, polishing, disinfecting, or deodorizing industrial and domestic surfaces, air freshening, perfume delivery, and hospital hygiene. U.S. Pat. No. 4,966,919 (Williams et al.) issued Oct. 30, 1990 describes use of certain HIPE foams for containing the deuterium/tritium fuel needed for a laser induced fusion reactor. U.S. Pat. No. 3,763,056 (Will) issued Oct. 2, 1973 discloses HIPE foams with numerous uses, including construction, furniture, toys, molded parts, casings, packaging material, filters, and in surgical and orthopedic applications. U.S. Pat. No. 3,256,219 (Will) issued Jun. 14, 1966 discloses uses wherein the HIPE is applied to a substrate prior to polymerization for use in insulation, flooring, wall and ceiling coverings or facings, as breathable artificial leather, separators for storage batteries, porous filters for gases and liquids, packing material, toys, for interior decoration, orthopedic devices, and as a cork substitute. U.S. Pat. No. 5,817,704 (Shiveley et al.) issued Oct. 6, 1998 discloses uses for heterogeneous HIPE foams including environmental waste oil sorbents, bandages and dressings, paint applicators, dust mop heads, wet mop heads, in fluid dispensers, in packaging, in shoes, in odor/moisture sorbents, in cushions, and in gloves. HIPE foams have also been cited for utility in disposable absorbent products such as diapers and catamenials. Exemplary patents are U.S. Pat. No. 5,650,222 (DesMarais et al.) issued Jul. 22, 1997 and U.S. Pat. No. 5,849,805 (Dyer) issued Dec. 15, 1998. The latter cites utility in bandages and surgical drapes, inter alia.

HIPE derived foams have been disclosed for use in air filtration. For example, WO 97/37745 (Chang et al.) published Oct. 16, 1997 discloses a filter material prepared from a porous substrate impregnated with a HIPE which is then polymerized. Two publications, Walsh et al. *J. Aerosol Sci.* 1996, 27(Suppl. 1), 5629–5630, and Bhumgara *Filtration & Separation* March 1995, 245, disclose the use of HIPE derived foams for air filtration. HIPE foams have also been used for insulation. U.S. Pat. No. 5,633,291 (Dyer et al.) issued May 27, 1997, U.S. Pat. No. 5,770,634 (Dyer et al.) issued Jun. 23, 1998, U.S. Pat. No. 5,728,743 (Dyer et al.) issued Mar. 17, 1998, and U.S. Pat. No. 5,753,359 (Dyer et al.) issued May 19, 1998 describe such foam materials used for insulation. The above patent and literature citations are included by reference.

One aspect of HIPE foams which has in some cases limited their utility has been the durability of these foams. In some potential applications, durability in terms of abrasion resistance, tear resistance, and toughness under shear or tensile loads is not provided at a level needed by HIPE foams described in the art. HIPE foams with comparatively higher abrasion resistance have been developed using a relatively high level of a toughening monomer such as styrene with respect to the level of crosslinking monomer within the formulation. Such formulations are described in more detail in provisional U.S. patent application Ser. No. 60/077,955, filed on Mar. 13, 1998 (P&G Case 7055P) and copending U.S. patent application Ser. No. 09/118,613, filed in the name of Conrad, et al. on Nov. 12, 1998. However, the art has failed to recognize the full utility of such toughened HIPE foams. Therefore, there is a need for foam-based implements having improved durability so as to provide increased utility to such implements. There is a further need for implements having increased flexibility in finished properties, such as fluid handling properties and mechanical properties. There is a still further need to provide implements having a diversity of shapes, both two-dimensional and tridimensional.

SUMMARY OF THE INVENTION

The present invention relates to the implements comprising open-celled polymeric foams are prepared by polymerization of certain water-in-oil emulsions having a relatively high ratio of water phase to oil phase, commonly known in the art as "HIPEs." As used herein, polymeric foam materials which result from the polymerization of such emulsions are referred to hereafter as "HIPE foams."

The implements of the present invention include those having a substantially two-dimensional structure, such as wipes, mats, shoe inserts, some artistic media, targets, medical wraps, and the like, and those having a substantially three-dimensional structure, such as, certain artistic media and toys, sponges, and the like. Other exemplary implements include fire starting materials, devices to aid food preparation, and plant care aids.

The HIPE foams used in the present invention comprise a nonionic polymeric low density, open celled, high surface area foam structure. These HIPE foams are formulated to provide a level of durability that makes them suitable for a wider range of uses than heretofore recognized. These HIPE foams have:

A) a density of less than about 100 mg/cc;

B) a glass transition temperature (Tg) of between about −40° and about 50° C.; and C) a toughness index of at least about 75.

The present invention provides for the formation of these HIPE foams into useful implements described below. Such foams are prepared via polymerization of a HIPE comprising a discontinuous water phase and a continuous oil phase wherein the ratio of water to oil is at least about 10:1, preferably at least about 12:1, and more preferably at least about 15:1. The water phase generally contains an electrolyte and a water soluble initiator. The oil phase generally consists of substantially water-insoluble monomers polymerizable by free radicals, an emulsifier, and other optional ingredients defined below. The monomers are selected so as to confer the properties desired in the resulting polymeric foam, e.g., the glass transition (Tg) between about −40° and 50° C., abrasion resistance and/or toughness sufficient for the end use, and economy (reflected by the relatively low density of less than about 100 mg/cc).

DETAILED DESCRIPTION OF THE INVENTION

I. Implement Types

The implements of the present invention include both flat and three dimensional structures having complex shapes. The implements further comprise certain HIPE foams treated with adjuvants as needed to promote their function. The following section describes each implement subgroup in more detail.

A. Wipes

This implement subgroup generally comprises two-dimensional relatively thin structures. The thickness will generally range between about 1 mm and about 4 mm. The other dimensions will be variable depending on the specific use. Further, the shape may be circular, ellipsoid, rectilinear, or any other shape as needed. The various uses of these wipe implements include disposable dusting wipes (which can be pretreated with dust attractant or furniture polish), make-up removing wipes, hand towels for drying wet skin, towels for drying surfaces, skin care wipes for the treatment of conditions like acne (in which case the wipes may be pretreated with an astringent such as witch hazel in 2-propanol and, optionally, an anti-acne medication such as benzoyl peroxide), cleaning wipes (in which case the wipes may be pretreated with a cleaning solution optionally containing vinegar, surfactant, solvent, chelant, bleach, brightener, antimicrobial, mild abrasive, rust-removing agents, tarnish removing agents, and the like), and applicator wipes (in which case the wipes may be pretreated with adjuvants such as wax, polish, paint, stain, plasticizer, and the like).

The cleaning wipes of the present invention are particularly useful for cleaning scratch prone surfaces such as computer monitors or television screens, windshields (especially windshields on aircraft), camera, telescope, or microscope lenses, and other delicate optics. These wipes are also useful in cleaning delicate surfaces such as ornamental plant leaves. Such wipes impregnated with a diluted aqueous vinegar solution are particularly useful for cleaning hard wood floors.

Wipes treated with bleach and a mild abrasive such as particulate calcium carbonate are particularly useful for cleaning soap scum off of sink, showers, tubs, refrigerators, and other household surfaces. Wipes may also be pretreated with metal polishing ingredients and used for polishing brass, copper, silver, and other metallic surfaces without scratching them. Alternatively, sided wipes (e.g., soft on one side and stiffer for scrubbing on the other) can be produced from a heterogeneous HIPE foam. Such heterogeneous HIPE foams are described generally in U.S. Pat. No. 5,817, 704 (Shiveley et al.) issued Oct. 6, 1998, included herein by reference.

Another embodiment of cleaning wipes comprises implements useful in medical applications, for example, in cleaning up splatters and spills of body fluids including blood, mucus, urine, excrement, sweat, and the like. The wipes may be used in surgery for hygienic purposes and may be pretreated with an appropriate antimicrobial so as to provide an aseptic environment. Similar wipes may be used for cleaning skin of incontinent individuals (in which case the wipes may be pretreated with a mild cleaning agent to facilitate removal of urine and feces from the skin without causing irritation). In general, the wipes may have hand held or attached to another implement such as a stick, thereby forming a mop.

Applicator wipes are particularly useful in applying a surface treatment such as wax to a car finish. Other applications include shining ingredients and plasticizers to the plastic or rubber surfaces of a car, paint and stain to furniture, polish to leather shoes and articles, and the like. Applicator wipes may also be used for application of various ingredients to one's skin wherein the hand is protected from the ingredient which may include sunscreen, zinc oxide based lotion for prevention of diaper rash, other diaper rash lotions, skin emollients, skin humectants, skin protectants including vitamins and antioxidants, insect repellents including N,N-diethyl-m-toluamide, and pesticides such as permethrin, pyrethrins, chlorpyrifos, carbaryl, methoprene, and the like.

These wipes may comprise only a section of thinly sliced HIPE foam or the foam may be laminated with another polymeric film or nonwoven item as needed. In one embodiment, the HIPE foam is laminated with a layer of abrasive nonwoven material to provide a two-side implement for cleaning and polishing hard-to-clean surfaces such as showers and tubs.

B. Artistic Media

These implements comprise structures similar in shape to wipes but generally with somewhat less flexibility. This reduced flexibility is developed using formulations that will provide a slightly higher Tg. Suitable Tgs range between about 20° C. and about 50° C. The HIPE foam so used may be treated so as to be hydrophilic for use with water-based inks and untreated for use with oil-based or acrylic paints or inks. The HIPE foam is found particularly to be well suited for commercial and graphic artistry which employ various types of ink markers. In these applications, line definition is critical. The line definition afforded by the artistic implements of the present invention is found to be superior to that afforded by paper because of the greater capacity of the HIPE foam for the ink and the resulting reduction in tendency of the ink to spread or wick prior to drying. Examples of such artistic media include use of suitable HIPE foams in place of paper, posters, canvas, and other sheetstock used for rendering art, including commercial art. Since the HIPE foam can be manufactured in a variety of 3-dimensional shapes (infra), sculptures can also be produced by molding or cutting/chiseling/etc. which can then be painted or colored as desired. HIPE foams for sculpturing generally will be selected from the types having higher Tgs, for example, at least about 40° C.

C. Targets

Sheets of HIPE foam have been found to form superior targets for practice with firearms, bows, paint guns, pellet guns, and other projectile devices. The penetration of the projectile through normal paper targets results in a hole with pieces of paper remaining attached but bent out the backside of the target. This can obscure the precise location of the hole, especially when two or more holes occur proximally. The same penetration through HIPE foams results in very clear penetration holes with no attached HIPE foam (since the foam is blown out the back completely). These holes can be discriminated from proximal holes far more precisely. The optimum Tg for such HIPE foams used for this purpose has been found to be between about 20° C. and about 50° C. to provide the stiffness desired with even a thin sheet of target material and to provide a the clearest penetration marking. These HIPE foam targets can be shaped and or painted or colored appropriately, for example by printing, as with a bulls eye or with the shape of another target type such as an animal. Larger targets may be formed into the shape and size of a target animal or object, again with painting as desired.

D. Toys

HIPE foams can serve as functional implements in a variety of toys and entertainment/educational articles typically oriented to children of all ages.

Exemplary toys are described in the following subgroups:

Stamps: The HIPE foam may be cut into a specific shape, for example, of an animal, to which ink is applied. The HIPE foam absorbs the ink and serves as an effective stamp for replicating the animal shape on paper or on a game board (as for tracking one's progress around the game board resulting from, for example, the throw of dice). An example stamp comprises a cylinder with a small handle having one face of HIPE foam carved or molded into a relief shape of the article to be stamped. When inked and stamped on paper, this transfers the stamp shape as an image to the paper or other substrate.

Blocks: The HIPE foam may be cut into intricate blocks to serve as interlocking building blocks, similar to the system described in U.S. Pat. No. 5,916,006 (Ganson) issued Jun. 29, 1999, incorporated herein by reference. The HIPE foam blocks may be compressed readily and stored in that state while recovering to the original state shortly after being liberated from the storage vessel. The recovery to the original shape is a particular advantage conferred by these thermoset HIPE foams. This minimizes the storage area required for the blocks. The blocks may also be connected using sticks.

Water Play Devices: HIPE foam can serve as a storage vessel for water which will release the water when compressed, as for example by a child jumping up and down on a slab of HIPE foam. The slab may be covered with a polymer sheet having holes through which water is expressed under pressure so as to mimic for example water spouts. The HIPE foam can similarly serves as a water slide which does not require constant wetting by a sprinkler. The HIPE foam may be spherically shaped to serve as projectile devices which may further be saturated with water or colored water. These spheres may be thrown or otherwise propelled as part of a game at other participants. The softness of the spheres prevents injury to the participants being hit while the absorbent capacity enables the balls to retain water in use.

Learning Devices: The HIPE foam may be shaped into wicking strips which may be immersed in colored water to illustrate the wicking property of these foams. Several of these wicking strips, for example, may be placed together in an arc, each strip of which being immersed in either in a colored water solutions. Subsequent wicking forms a multicolored arc approximating a rainbow while illustrating the principles of capillarity. As the cell size of the strips is varied, the rate of wicking and the height to which the aqueous solutions will wick will vary. The HIPE foams may be shaped into spheres exhibiting different Tgs and used, for example, as stress relievers. Various other shapes may be formed, for example, by molding, using higher Tg materials which are compliant when heated in an oven or with a hair dryer for example and then "freeze" into any deformed shape when the HIPE foam cools. Such implements generally can be used in "science projects" and demonstrations for pedagogical purposes.

E. Fire Starting

The flammability of most HIPE foams can be useful in starting fires. In one embodiment, a flat circular piece of HIPE foam impregnated with lighter fluid may be used under a bed of charcoal briquettes. The HIPE foam is lit and serves as a wick for the lighter fluid which burns off for a period of time, heating the briquettes and starting the fire. Standing to let the fluid soak into the briquettes is not needed, so less evaporation of the hydrocarbon into the atmosphere as a pollutant results. The same process can be used for starting wood fires in stove, fireplaces, camp rings, etc. The HIPE foams are typically composed of polymers which burn completely and leave no residue. The lighter fluid in the above examples may be replaced by an flammable substance such as paraffin for example that provides the burning liquid with heat. This provides an article which can be used without amendment.

F. Food Preparation and Cooking Implements

Implements devised for food preparation and cooking are generally also two dimensional and relatively thin as are the wipes described above. The utility of such implements derives from the ability of HIPE foams, when suitably treated, to absorb both aqueous and oily fluids, or to absorb oily liquids but not aqueous liquids. For example, a tray for microwaving meats can be devised by providing a layer of HIPE foam between the meat and the support tray (generally a hard plastic). The grease produced during cooking or reheating is absorbed by the HIPE foam. This is particularly useful in cooking fatty meats such as bacon. This can also be used in baking and roasting when the food being cooked expresses significant liquid such as grease. The HIPE foam strip may also be partially or fully saturated with water optionally containing spices and placed under the item being cooked as a reservoir of water to provide steam, as in the cooking of vegetables such as broccoli.

In food preparation, a sheet of HIPE foam can serve as a protective cover over a counter top when the preparer is manipulating greasy, damp, or other food stuffs, for example, including raw meat such as chicken, lettuce (after washing), potatoes (for example, during peeling), and in other cases where such a protective cover would be of value. After use, the cover of HIPE foam is discarded along with any food byproducts which are not wanted, including the germs they may have carried. The HIPE foam can also be used as the absorbent component in a meat tray for items sold in the supermarket. The HIPE foam may also be used in food storage in wrapping products to protect them from the environment, retard spoilage, prevent freezer burn, prevent spillage.

G. Plant Care

The HIPE foams of the present invention may be used in devices intended to provide water and fertilizer to plants. Exemplary of this would be a suspended vessel containing HIPE foam filled with water and, optionally, fertilizer which would provide a slow drip of the solution to prevent overwatering and ensure a more natural watering process. A similar device may be constructed to deliver an herbicidal or pesticidal solution upon application of pressure to the ground or other object by squeezing out a measured dose of said solution directly on the target area. In one embodiment, a bottle having a hollow narrow tube at its orifice and containing water and adjuvants is inverted and inserted into the soil near a plant. The rate of water delivery to the plant is controlled by the type and thickness of a HIPE foam insert within the head of the bottle that prevents all the liquid from being applied at once.

H. Medical Wraps

The HIPE foams of the present invention may be used to deliver and hold hot or cold water or other liquid to an area of the body needing such application for therapy. For example, a piece of HIPE foam cut 10 cm thick and 20 cm wide and 50 cm long can be soaked in hot water (or icy water) and applied as a compress to the area needing thermal therapy. The HIPE foams so used may include other ingredients including topical anesthetics such as salicylates, dimethyl sulfoxide, capsaicin; antimicrobials; heating aids such as methyl salicylate; cooling aids such as menthol or pentane or ethyl chloride; fragrances; carbonation; minerals such as gypsum salts (magnesium sulfate), and the like. The HIPE foams so used will generally be hydrophilic and small-celled so as to reduce the amount of drippage occurring and also will generally have a relatively low Tg between about $-40°$ and about $20°$ C. so as to be compliant at body temperature. HIPE foams intended for use with ice water may optimally have a lower Tg between about $-40°$ and about $0°$ C. to retain conformability at the lower temperatures. These devices are better at adopting the body's irregular shape than bags of water or ice currently used in such applications.

II. HIPE Foams

HIPE foams of the present invention are broadly useful for forming implements for cleaning, wiping, applying a material to a surface, as artistic media, in making toys, in use as targets, in starting fires, in cooking and food preparation, in plant care, and in therapeutic wraps. These HIPE foams may be provided in various shapes including flat pieces or sheets, cylinders, cubes, and irregular or customized shapes of varying sizes to fit the application.

The HIPE foams of this invention may be laminated or bonded to other support media to provide stiffness, strength, durability, an abrasive surface, or a protective impermeable barrier. The HIPE foams may be shaped or developed from molded HIPE as needed. The implement may also comprise a segment of an integral HIPE derived foam piece wherein the upper portion has relatively large cells and the lower portion has relatively small cells. Such multi segment implements can comprise a heterogeneous foam as described in the aforementioned U.S. Pat. No. 5,817,704. The HIPE foam may be adhered to another foam type such as a polyurethane foam section or an expanded or extruded polystyrene foam, as nonlimiting examples.

A. Cell Sizes and Microstructure

Foam cells, and especially cells that are formed by polymerizing a monomer-containing oil phase that surrounds relatively monomer-free water-phase droplets, will frequently be substantially spherical in shape. The size or "diameter" of such spherical cells is a commonly used parameter for characterizing foams in general. Since cells in a given sample of polymeric foam will not necessarily be all of the same size, an average cell size, i.e., average cell diameter, will often be specified.

Figure 1:
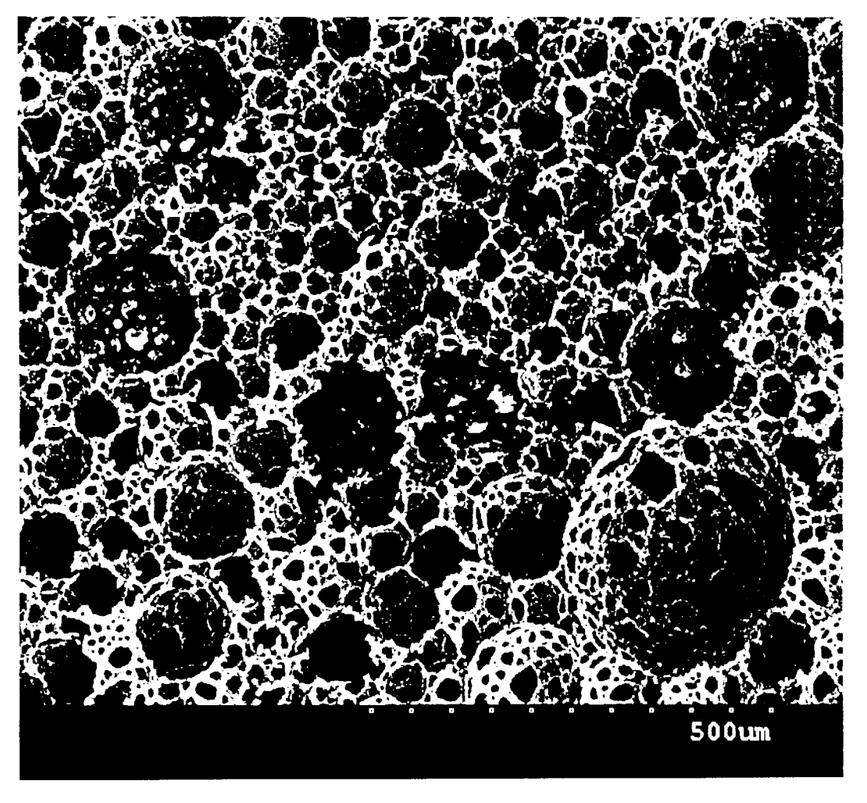
The FIGURE shows a photomicrograph of a HIPE foam structure according to the present invention in its expanded state.

A number of techniques are available for determining the average cell size of foams. The most useful technique, however, for determining cell size in foams involves a simple measurement based on the scanning electron photomicrograph of a foam sample. The figure, for example, shows a typical HIPE foam structure (Foam 1j of Example 1) according to the present invention in its expanded state. Superimposed on the photomicrograph a series of small dots wherein the spacing between individual pairs of dots represents a dimension of 500 $\mu$m. Such a scale can be used to determine average cell size via an image analysis procedure.

The cell size measurements given herein are based on the number average cell size of the foam in its expanded state, e.g., as shown in the figure. Cell size can influence several properties of interest, including ability to retain fluids without draining, speed of acquisition of fluids, ability to stay thin after drying, and surface smoothness. For most of the implements described herein, an average cell size of between about 30 $\mu$m and about 80 $\mu$m is optimal except where noted as an exception. As noted above, in some cases the specific unitary piece of foam will comprise regions having largely one cell size average in communication with regions having a different cell size average. In cases where blood absorbency is desired, cell sizes will need to exceed about 40 $\mu$m on average so that the holes connecting the cells will be of sufficient size to allow passage of red blood cells, which are approximately 8 $\mu$m in diameter.

The polymeric foams used in accordance with the present invention are highly open-celled. This means the individual cells of the foam are in complete, unobstructed communication with adjoining cells. The cells in such substantially open-celled foam structures have intercellular openings or "windows" connecting one cell to the other within the foam structure.

These substantially open-celled foam structures will generally have a reticulated character with the individual cells being defined by a plurality of mutually connected, three dimensionally branched webs. The strands of polymeric material making up these branched webs can be referred to as "struts." Open-celled foams having a typical strut-type structure are shown by way of example in the photomicrographs of FIG. 1. As used herein, a foam material is "open-celled" if at least 80% of the cells in the foam structure that are at least 1 $\mu$m in size are in open communication with at least one adjacent cell.

B. Hydrophilicity

Copolymers comprising the HIPE foams of the present invention are inherently hydrophobic. That is, the copolymer formed will maintain a large contact angle with water or other aqueous fluid except those containing a surface tension lowering agent. In practice, HIPE foams may contain residual salt and emulsifier to afford a degree of hydrophilicity which may be advantageous or not depending on the intended application. If hydrophilicity is not desired, emulsifiers can be chosen that render the surface poorly hydrophilic under ambient conditions. Examples include such high melting emulsifiers such as sorbitan stearate and commercial mixtures thereof. Also, removal of any residual salt will tend to enhance hydrophobicity. Finally, residual emulsifier can be removed by treatment with an organic solvent under extracting conditions (e.g., Soxhlet) so as to produce a very hydrophobic surface. Conversely, where hydrophilicity is desired, any of the treatments described in U.S. Pat. No. 5,352,711 (DesMarais) issued Oct. 4, 1994 or U.S. Pat. No. 5,292,777 (DesMarais et al.) issued Mar. 8, 1994 or U.S. Pat. No. 5,849,805 (Dyer) issued Dec. 15, 1998 can be employed. Generally, these comprise treatment of the HIPE foam to confer a residual wetting agent which reduces the contact angle of an aqueous fluid and allows concomitant hydrophilicity. The wetting agent may be chosen to meet the requirements specific to the application intended with respect to human safety, cost, retention, etc.

C. Durability

Durability represents the ability of the HIPE foams of the present invention to maintain their integrity under use to the extent required. The durability requirement will vary according to intended use. Among the properties that can affect the ability of a HIPE foam to resist degradation in use are: abrasion resistance (the ability to resist tearing, abrading, pilling, or other forms of failure when subjected to surface stress, including torsional stress or normal stress); tensile toughness (the ability to absorb tensile forces without premature failure, traditionally characterized as the area under the curve generated in a stress-strain experiment); tensile strength (maximum stress achieved at failure); tear resistance; tensile strain at break; and compression resistance.

No single failure mode is common in all applications. Similarly, no single criterion is common for all applications. To resolve this complexity while also providing a succinct and specific definition of durability, a Toughness Index can be defined (see discussion below) which delineates a relationship among the critical factors related to toughness. As defined herein, a "Toughness Index" of 0 represents a HIPE foam which fails readily under even slight force. A suitable HIPE foam for purposes of the present invention has a toughness index which exceeds about 75. Preferably, the Toughness Index is between about 75 and about 200, more preferably between about 100 and 175.

Abrasion Resistance: The best method defined for assessing abrasion resistance, hereinafter termed "AR", has been by subjective assessment by at least 4 individuals using blind comparative methods. Each assigns a grade of 1 through 5 wherein 5 reflects the highest degree of abrasion resistance and 1 reflects a grade given to a material which is destroyed with very little surface shear. The individual scores are averaged relative to a suitable control with the result reported. While this somewhat subjective rating system is not in all respects satisfactory, it has been found to be more useful than any of several measurements described in the literature for conducting similar tests as applied to HIPE foams.

Tan[δ] Shape Factor: In general, it is desired that the tan[δ] curve determined by Dynamic Mechanical Analysis (DMA) of the HIPE foams of the present invention be relatively narrow. The tan[δ] shape factor may be defined according to width at half-height, for example, though practically it is found to be as useful and more precise to simply record the maximum height of the tan[δ] curve, typically a value ranging between about 0.2 and 0.7, where the higher value reflects a narrower curve and a HIPE foam having a tendency towards greater toughness. A narrow tan[δ] shape factor allows the Tg of the HIPE foam to be relatively near, but below, the use temperature (Tu) without incurring a high level of loss modulus (E") at the use temperature. In other words, the storage modulus (E') curve will have substantially reached the rubbery plateau at the use temperature. This can also be effected by establishing a very low Tg, but the resulting HIPE foam generally will be too weak in other respects. Generally, to achieve a relatively narrow tan[δ] curve, the HIPE foam must be formulated to contain a relatively low level of crosslinking monomer and also have comonomers which copolymerize in a relatively random way, e.g., having reactivity ratios not too far from unity so that no long blocks of one comonomer are likely to form. Discussion of the influence of reactivity ratios on copolymer randomness may be found in Odian, G. "Principles of Polymerization", Wiley & Sons, New York, Third Ed.; 1991, pp 461–465.

Glass Transition Temperature (Tg): The Tg of the HIPE foams is the temperature at the peak of the tan[δ] curve on the x-axis using the method described in U.S. Pat. No. 5,817,704 (Shiveley et al.) issued Oct. 6, 1998. The Tg is particularly important as it relates to the product use temperature, Tu. Generally, to provide a HIPE foam that will distend under tensile forces without failing, the Tg must be at least about 12° C. below the Tu. When the tan[δ] curve is broad (see discussion above), this temperature difference must be even greater. Since Tg is dependent on the rate of the measurement (which in the case of a DMA experiment comprises a cyclic low strain distortion of the sample), the Tg should be measured it a rate approximating that of the most likely rate of distortion incurred during use. A HIPE foam with a relatively high Tg measured at the standard 1.0 radians per second may be perfectly suited for a use wherein the distortions incurred in use are at a slower rate. Measurement of the Tg at a more realistic rate will provide a "realistic" Tg which is then at least about 10° C. below use temperature (Tu). Having the Tg much below Tu is generally not advantageous. The steps taken to provide a HIPE foam with a very low Tg, for example below about −40° C., involve selecting comonomers which will invariably produce a HIPE foam which is flexible yet too weak for most uses.

Density: Foam density plays a significant role in the durability of any HIPE foam. The more dense the example, the more durable the HIPE foam will be within the range of densities of interest. For most applications, the HIPE foam will cost more in use as the density is increased. Hence, generally, it is desirable to operate at a density as low as possible to provide for economy. A method for measuring dry foam density is disclosed in U.S. Pat. No. 5,387,207 (Dyer et al.) issued Feb. 7, 1995.

Formation Quality: Generally, this is a qualitative factor which is assessed by inspection of photomicrographs of the HIPE foam.

Toughness Index: Having described these disparate factors, it is clear that a composite value would be useful in describing the durable foams of the present invention. For the purposes of the present invention, the toughness index, hereinafter termed "TI", is defined using the following equation:

$$TI = a*\text{density} + b*\tan[\delta]\text{height} + c*(Tu-Tg-12) + d*AR$$

wherein density is expressed in units of mg/cc, (Tu−Tg) is in units of ° C., and tan[δ] height and AR are unitless. Note that the difference (Tu−Tg) is not to exceed 15° C., as values greater than that are not generally useful. The coefficients a, b, c, and d are assigned the following values, based on empirical research:

$$a=1; b=100; c=-5; d=10.$$

The following is offered as two examples of HIPE foams of the current invention and one HIPE foam not of the current invention. (The details of the making of these foams is enumerated in the Examples section.) The first HIPE foam, Foam 1b of Example 1, is prepared from oil phases comprising 26.3% styrene, 16.2% divinyl benzene of 42% purity, and 57.5% 2-ethylhexyl acrylate (EHA) at a W:O ratio of 13:1 using 4% by weight of oil phase diglycerol monooleate (DGMO) emulsifier. The second HIPE foam, Foam 2, is prepared identically except that styrene is replaced on a weight for weight basis with methyl methacrylate. The third HIPE foam, Foam 3, is prepared identically except that the monomers used comprise 42% DVB42 and 58% EHA and the W:O ratio is 35:1. Foam 3 is provided for comparative purposes to illustrate a HIPE foam not within the current invention. The following shows the various components measured for these foams and the resulting TI value for each.

|  | Foam 1b of Table 1 | Foam 2 | Foam 3 |
| --- | --- | --- | --- |
| Density (mg/cc) | 71 | 72 | 28 |
| tan [δ] height | 0.61 | 0.44 | 0.26 |
| Tg-Tu*-12° | 2° | 1° | 8° |
| AR | 4 | 3.5 | 1 |
| TI | 162 | 146 | 24 |

*In this example, Tu is defined as "room temperature" of 22° C.

The TI value for Foams 1 and 2 exceed the criterion that TI must exceed at least about 75 for the HIPE foams of the present invention. Foam 3 is less than the critical value of at least about 75.

D. Surface Treatments

The HIPE foams of the present invention may be treated after preparation with any of a number of agents which modify the surface of the polymer. Such agents include surfactants added to confer hydrophilicity as discussed in Section C supra. Other agents may be added to confer color or tint, antimicrobial activity, powders, and the like. Additionally, treatments to provide improved adhesion of particulate matter may be applied to the implements of the present invention. These will enable the implement to attract and hold materials such as dirt and dust. An example of such treatment is given in U.S. patent application Ser. No. 09/082, 396, filed in the name of Fereshtehkhou, et al. on May 20, 1998. The HIPE foam may also be treated with any of a variety of high energy treatments intended to modify the surface of the foam including electron beam, gamma radiation, plasma, and the like. Such treatments may chemically modify the surface of the foam to render it suitable for further treatment with adjuvants like dyes etc. so as to retain the dyes by covalent or electrostatic bonding.

III. Preparation of HIPE Foams

A. In General

Polymeric foams useful in the present invention are prepared by polymerization of HIPEs. The relative amounts of the water and oil phases used to form the HIPEs are used to control the density of the resulting HIPE foam. The emulsions used to prepare the HIPE foams will generally have a volume to weight ratio of water phase to oil phase in the range of from about 10:1 to about 100:1, more preferably from about 13:1 to about 50:1, most preferably between about 15:1 and about 20:1. These ratios govern the eventual density of the HIPE foam produced.

The process for obtaining these foams comprises the steps of:

(A) forming a water-in-oil emulsion using low shear mixing from:
  (1) an oil phase comprising:
    (a) from about 80% to about 98% by weight of a monomer formulation capable of forming a copolymer having a Tg value of from about −40° C. to about 50° C., said monomer formulation comprising:
      (i) from about 30% to about 80% by weight of a substantially water-insoluble, monofunctional monomer capable of forming a homopolymer having a Tg of about 35° C. or less;
      (ii) from about 10% to about 70% by weight of a substantially water-insoluble, monofunctional comonomer capable of imparting toughness about equivalent to that provided by styrene (referred to herein as the "toughening monomer");
      (iii) from about 2% to about 40% of a substantially water-insoluble, polyfunctional crosslinking monomer, wherein the ratio of toughening monomer to crosslinking monomer is at least about 3:1; and
    (b) from about 2% to about 20% by weight of an emulsifier component which is soluble in the oil phase and which is suitable for forming a stable water-in-oil emulsion;
  (2) a water phase comprising from about 0.1% to about 20% by weight of a water-soluble electrolyte; and
  (3) a volume to weight ratio of water phase to oil phase in the range of from about 12:1 to about 100:1; and
(B) polymerizing the monomer component in the oil phase of the water-in-oil emulsion to form the polymeric foam material.

The polymeric foam material can be subsequently iteratively washed and dewatered to provide a dry, hydrophobic foam that may be shaped as desired. Such shaping may comprise cutting into thin continuous section or cubes or other rectilinear shapes. Alternatively, the HIPE foam will adopt the shape of the vessel in which it is cured, so complex shapes including cylinders etc. can be formed by appropriate selection of curing vessel shape.

1. Oil Phase Components

The continuous oil phase of the HIPE comprises monomers that are polymerized to form the solid foam structure. This monomer component is formulated to be capable of forming a copolymer having a Tg of from about −40° to about 50° C., and preferably from about 0° to about 50°. (The method for determining Tg by Dynamic Mechanical Analysis (DMA) is described in the U.S. Pat. No. 5,817,704 (Shiveley et al.) issued Oct. 6, 1998, incorporated herein by reference. This monomer component includes: (a) at least one monofunctional monomer whose atactic amorphous polymer has a Tg of about 25° C. or lower (see Brandup, J.; Immergut, E. H. "Polymer Handbook", 2nd Ed., Wiley-Interscience, New York, N.Y., 1975, III-139.); (b) at least one monofunctional comonomer to improve the toughness or tear resistance of the foam; and (c) a polyfunctional crosslinking agent. Selection of particular types and amounts of monofunctional monomer(s) and comonomer(s) and polyfunctional cross-linking agent(s) can be important to the realization of absorbent HIPE foams having the desired combination of structure, and mechanical properties which render such materials suitable for use in the invention herein.

The monomer component comprises one or more monomers that tend to impart rubber-like properties to the resulting polymeric foam structure. Such monomers can produce high molecular weight (greater than 10,000) atactic amorphous polymers having Tgs of about 25° C. or lower. Monomers of this type include, for example, the $C_4$–$C_{14}$ alkyl acrylates such as butyl acrylate, hexyl acrylate, octyl acrylate, 2-ethylhexyl acrylate, nonyl acrylate, decyl acrylate, dodecyl (lauryl) acrylate, isodecyl acrylate, tetradecyl acrylate; aryl and alkaryl acrylates such as benzyl acrylate and nonylphenyl acrylate; the $C_6$–$C_{16}$ alkyl methacrylates such as hexyl methacrylate, octyl methacrylate, nonyl methacrylate, decyl methacrylate, isodecyl methacrylate, dodecyl (lauryl) methacrylate, and tetradecyl methacrylate; acrylamides such as N-octadecyl acrylamide; $C_4$–$C_{12}$ alkyl styrenes such as p-n-octylstyrene; and combinations of such monomers. Of these monomers, isodecyl acrylate, dodecyl acrylate and 2-ethylhexyl acrylate are the most preferred. The monofunctional monomer(s) will generally comprise 10 to about 70%, more preferably from about 20 to about 50%, by weight of the monomer component.

The monomer component utilized in the oil phase of the HIPEs also comprises one or more monofunctional comonomers capable of imparting toughness about equivalent to that provided by styrene to the resulting polymeric foam structure. Tougher foams exhibit the ability to deform substantially without failure. These monofunctional comonomer types can include styrene-based comonomers (e.g., styrene and ethyl styrene) or other monomer types such as methyl methacrylate where the related homopolymer is well known as exemplifying toughness. Another example of a monomer which confers a high level of toughness to the resulting HIPE foam is isoprene and related dienes such as piperylene and dimethylbutadiene. The preferred monofunctional comonomer of this type is a styrene-based monomer with styrene and ethyl styrene being the most preferred monomers of this kind. The monofunctional "toughening" comonomer will normally comprise from about 10 to about 70%, preferably from about 20% to about 50%, most preferably from about 30% to about 50%, by weight of the monomer component.

In certain cases, the "toughening" comonomer can also impart the desired rubber-like properties to the resultant polymer. The $C_4$–$C_{12}$ alkyl styrenes, and in particular p-n-octylstyrene, and isoprene and related dienes are examples of such comonomers. For such comonomers, the amount that can be included in the monomer component will be that of the typical monomer and comonomer combined. Of these types, isoprene is the most preferred type. Its use may require the employment of pressurized curing conditions owing to the relatively high volatility of this monomer in comparison with conventional curing conditions. Alternatively, the curing may be carried out in multiple stages as described in U.S. Pat. No. 5,252,619 (Brownscombe et al.) issued Oct. 12, 1993.

The monomer component also contains polyfunctional crosslinking agent. As with the monofunctional monomers and comonomers, selection of the particular type and amount of crosslinking agent(s) is important to the eventual realization of preferred polymeric foams having the desired combination of structural and mechanical properties.

The polyfunctional crosslinking agent can be selected from a wide variety of monomers containing two or more activated vinyl groups, such as divinylbenzenes and analogs thereof. Analogs of divinylbenzenes useful herein include, but are not limited to, trivinyl benzenes, divinyltoluenes, divinylxylenes, divinylnaphthalenes divinylalkylbenzenes, divinylphenanthrenes, divinylbiphenyls, divinyldiphenylmethanes, divinylbenzyls, divinylphenylethers, divinyldiphenylsulfides, divinylfurans, divinylsulfide, divinylsulfone, and mixtures thereof. Divinylbenzene is typically available as a mixture with ethyl styrene in proportions of about 55:45. These proportions can be modified so as to enrich the oil phase with one or the other component. Generally, it is advantageous to enrich the mixture with the ethyl styrene component while simultaneously reducing the amount of styrene in the monomer blend. The preferred ratio of divinylbenzene to ethyl styrene is from about 30:70 to 55:45, most preferably from about 35:65 to about 45:55. The inclusion of higher levels of ethyl styrene imparts the required toughness without increasing the Tg of the resulting copolymer to the degree that styrene does. This first cross-inking agent can generally be included in the oil phase of the HIPE in an amount of from about 2 to about 50%, more preferably from about 10 to about 35%, most preferably from about 15% to about 25%, by weight of the monomer component (100% basis). Other types of crosslinking agents include polyfunctional acrylates selected from the group consisting of diacrylates of diols and analogs thereof. Such crosslinking agents include methacrylates, acrylamides, methacrylamides, and mixtures thereof. These include di-, tri-, and tetra-acrylates, as well as di-, tri-, and tetra-methacrylates, di-, tri-, and tetra-acrylamides, as well as di-, tri-, and tetra-methacrylamides; and mixtures of these crosslinking agents. Suitable acrylate and methacrylate crosslinking agents can be derived from diols, triols and tetraols that include 1,10-decanediol, 1,8-octanediol, 1,6-hexanediol, 1,4-butanediol, 1,3-butanediol, 1,4-but-2-enediol, ethylene glycol, diethylene glycol, trimethylolpropane, pentaerythritol, hydroquinone, catechol, resorcinol, triethylene glycol, polyethylene glycol, sorbitol and the like. (The acrylamide and methacrylamide crosslinking agents can be derived from the equivalent diamines, triamines and tetramines). The preferred diols have at least 2, more preferably at least 4, most preferably 6, carbon atoms. This second cross-linking agent can generally be included in the oil phase of the HIPE in an amount of from 0 to about 15% by weight of the monomer component.

The major portion of the oil phase of the HIPEs will comprise the aforementioned monomers, comonomers and crosslinking agents. It is essential that these monomers, comonomers and crosslinking agents be substantially water-insoluble so that they are primarily soluble in the oil phase and not the water phase. Use of such substantially water-insoluble monomers ensures that HIPEs of appropriate characteristics and stability will be realized. It is, of course, highly preferred that the monomers, comonomers and crosslinking agents used herein be of the type such that the resulting polymeric foam is suitably non-toxic and appropriately chemically stable. These monomers, comonomers and cross-linking agents should preferably have little or no toxicity if present at very low residual concentrations during post-polymerization foam processing and/or use.

Another essential component of the oil phase of the HIPE is an emulsifier component that comprises at least a primary emulsifier. Suitable primary emulsifiers are well known to those skilled in the art. Particularly preferred emulsifiers include Crill-6™, Span 20™, Span 40™, Span 60™, and Span 80™. These are nominally esters of sorbitan derived from lauric, myristic, stearic, and oleic acids, respectively. Other preferred emulsifiers include the diglycerol esters derived from monooleate, monomyristate, monopalmitate, and monoisostearate acids. A particularly preferred emulsifier is diglycerol monooleate (DGMO). Mixtures of these emulsifiers are also particularly useful, as are purified versions of each, specifically sorbitan esters containing minimal levels of isosorbide and polyol impurities.

In addition to these primary emulsifiers, secondary emulsifiers can be optionally included in the emulsifier component. Again, those skilled in the art well recognize that any of a variety of known emulsifiers may be used. These secondary emulsifiers are at least cosoluble with the primary emulsifier in the oil phase. Secondary emulsifiers can be obtained commercially or prepared using methods known in the art. The preferred secondary emulsifiers are ditallow dimethyl ammonium methyl sulfate and ditallow dimethyl ammonium methyl chloride. When these optional secondary emulsifiers are included in the emulsifier component, it is typically at a weight ratio of primary to secondary emulsifier of from about 50:1 to about 1:4, preferably from about 30:1 to about 2:1.

As is indicated, those skilled in the art will recognize that any suitable emulsifier(s) can be used in the processes for making the foams of the present invention. For example, See U.S. Pat. Nos. 5,387,207 and 5,563,179 (Stone et al.) issued Oct. 8, 1996, included herein by reference.

The oil phase used to form the HIPEs comprises from about 85 to about 98% by weight monomer component and from about 2 to about 15% by weight emulsifier component. Preferably, the oil phase will comprise from about 90 to about 97% by weight monomer component and from about 3 to about 10% by weight emulsifier component. The oil phase also can contain other optional components. One such optional component is an oil soluble polymerization initiator of the general type well known to those skilled in the art, such as described in U.S. Pat. No. 5,290,820 (Bass et al), issued Mar. 1, 1994, which is incorporated by reference.

A preferred optional component is an antioxidant such as a Hindered Amine Light Stabilizer (HALS) such as bis-(1, 2,2,5,5-pentamethylpiperidinyl) sebacate (Tinuvin-765®) or a Hindered Phenolic Stabilizer (HPS) such as Irganox-1076® and t-butylhydroxy-quinone. Radical scavengers such as didodecyl 3,3'-thiodioprionate may be included in the oil phase. Another optional component is a plasticizer such as dioctyl azelate, dioctyl sebacate, dioctyl adipate, or dioctyl phthalate, also including the dinonyl and didecyl and other homologs of these plasticizers. Yet another optional ingredient is filler particles which may toughen the polymer and/or increase its thermal insulating properties and/or increase the absorption of microwave radiation so as to cause the foam to heat up in a microwave oven for cooking and browning of foods. Example filler particles include aluminum, titanium dioxide, carbon black, graphite, calcium carbonate, talc, and the like. Other optional components include colorants (dyes or pigments), fluorescent agents, opacifying agents, chain transfer agents, vitamins, food flavorings or spices, edible oils, pharmacologically active agents, cleaning agents, shining agents, polishing agents, waxes, and the like.

2. Water Phase Components

The discontinuous water internal phase of the HIPE is generally an aqueous solution containing one or more dissolved components. One essential dissolved component of the water phase is a water-soluble electrolyte. The dissolved electrolyte reduces the aqueous phase solubility of monomers, comonomers, and crosslinkers. This, in turn, is believed to minimize the extent to which polymeric material fills the cell windows at the oil/water interfaces formed by the water phase droplets during polymerization. Thus, the presence of electrolyte and the resulting ionic strength of the water phase is believed to determine whether and to what degree the resulting preferred polymeric foams can be open-celled.

Any electrolyte capable of imparting ionic strength to the water phase can be used. Preferred electrolytes are mono-, di-, or trivalent inorganic salts such as the water-soluble halides, e.g., chlorides, nitrates and sulfates of alkali metals and alkaline earth metals. Examples include sodium chloride, calcium chloride, magnesium chloride, sodium sulfate, and magnesium sulfate. Calcium chloride is the most preferred for use in preparing the HIPEs. Generally the electrolyte will be utilized in the water phase of the HIPEs in a concentration in the range of from about 0.2 to about 20% by weight of the water phase. More preferably, the electrolyte will comprise from about 1 to about 10% by weight of the water phase.

The HIPEs will also typically contain an effective amount of a polymerization initiator. Such an initiator component is generally added to the water phase of the HIPEs and can be any conventional water-soluble free radical initiator. These include peroxygen compounds such as sodium, potassium and ammonium persulfates, hydrogen peroxide, sodium peracetate, sodium percarbonate and the like. Conventional redox initiator systems can also be used. Such systems are formed by combining the foregoing peroxygen compounds with reducing agents such as sodium bisulfite, L-ascorbic acid or ferrous salts. Also included are various azo compounds which produce nitrogen and radicals when heated. Exemplary is azobisisobutyronitrile and other water and oil soluble azo derivatives.

The initiator can be present at up to about 20 mole percent based on the total moles of polymerizable monomers present in the oil phase. More preferably, the initiator is present in an amount of from about 0.001 to about 10 mole percent based on the total moles of polymerizable monomers in the oil phase.

3. Hydrophilizing Surfactants and Hydratable Salts

The polymer forming the HIPE foam structure will generally be substantially free of polar functional groups. This means the polymeric foam will be relatively hydrophobic in character.

When these foams are to be used to imbibe or wick aqueous fluids, some affinity for water will be a desired feature. This may be conferred by residual emulsifier and/or salt following polymerization. Once the HIPE foam is wetted, these adjuvants are no longer needed, unless the HIPE foams dries out prior to reuse.

B. Processing Conditions for Obtaining HIPE Foams

Foam preparation typically involves the steps of: 1) forming a stable high internal phase emulsion (HIPE); 2) polymerizing/curing this stable emulsion under conditions suitable for forming a solid polymeric foam structure; 3) optionally washing the solid polymeric foam structure to remove the original residual water phase, emulsifier, and salts from the polymeric foam structure, and 4) thereafter dewatering this polymeric foam structure.

1. Formation of HIPE

The HIPE is formed by combining the oil and water phase components in the previously specified ratios. The oil phase will typically contain the requisite monomers, comonomers, crosslinkers, and emulsifiers, as well as optional components such as plasticizers, antioxidants, flame retardants, and chain transfer agents. The water phase will typically contain electrolytes and polymerization initiators.

The HIPE can be formed from the combined oil and water phases by subjecting these combined phases to shear agitation. Shear agitation is generally applied to the extent and for a time period necessary to form a stable emulsion. HIPE can be generated in a batch or continuous fashion. Generally conditions suitable for forming an emulsion involve forming water phase droplets dispersed in the oil phase in a fashion resulting (after curing) in a polymeric foam having the requisite structural characteristics. Emulsification of the oil and water phase combination will frequently involve the use of a mixing or agitation device such as a pin impeller.

One preferred method of forming HIPE involves a continuous process that combines and emulsifies the requisite oil and water phases. In such a process, a liquid stream comprising the oil phase is formed. Concurrently, a separate liquid stream comprising the water phase is also formed. The two separate streams are then combined in a suitable mixing chamber or zone such that the requisite water to oil phase weight ratios previously specified and oil droplet sizes desired are achieved.

In the mixing chamber or zone, the combined streams are generally subjected to shear agitation provided, for example, by a pin impeller of suitable configuration and dimensions. Shear will typically be applied to the combined oil/water phase stream at an appropriate rate. Once formed, the stable liquid HIPE can then be withdrawn from the mixing chamber or zone. This preferred method for forming HIPEs via a continuous process is described in greater detail in U.S. Pat. No. 5,149,720 (DesMarais et al), issued Sep. 22, 1992, which is incorporated by reference. See also copending U.S. patent application Ser. No. 08/370,694, filed Jan. 10, 1995 by T. DesMarais (incorporated herein by reference), which describes an improved continuous process having a recirculation loop for the HIPE. These patents are included herein by reference.

2. Polymerization/Curing of the HIPE

The HIPE formed will generally be collected or poured in a suitable reaction vessel, container or region to be polymerized or cured. In one embodiment, the reaction vessel comprises a tub constructed of polyethylene from which the eventually polymerized/cured solid foam material can be easily removed for further processing after polymerization/curing has been carried out to the extent desired. The temperature at which the HIPE is poured into the vessel is preferably approximately the same as the polymerization/curing temperature.

Suitable polymerization/curing conditions will vary depending upon the monomer and other makeup of the oil and water phases of the emulsion (especially the emulsifier systems used), and the type and amounts of polymerization initiators used. Frequently, however, suitable polymerization/curing conditions will involve maintaining the HIPE at elevated temperatures above about 30° C., more preferably above about 35° C., for a time period ranging from about 2 to about 64 hours, more preferably from about 4 to about 48 hours. The HIPE can also be cured in stages such as described in U.S. Pat. No. 5,189,070 (Brownscombe et al), issued Feb. 23, 1993, which is herein incorporated by reference.

One particular advantage of the more robust emulsifier systems used in these HIPEs is that the polymerization/curing conditions can be carried out at more elevated temperatures of about 50° C. or higher, more preferably about 60° C. or higher. Typically, the HIPE can be polymerized/cured at a temperature of from about 60° to about 99° C., more typically from about 65° to about 95° C. If the HIPE is cured under pressure, the curing temperature can exceed 100° C. with concomitant reduction in curing time.

A porous water-filled open-celled HIPE foam is typically obtained after polymerization/curing in a reaction vessel, such as a tub. This polymerized HIPE foam is typically cut or sliced into a sheet-like form. Sheets of polymerized HIPE foam are easier to process during subsequent treating/washing and dewatering steps, as well as to prepare the HIPE foam for use in insulation materials. The polymerized HIPE foam is typically cut/sliced to provide a cut thickness in the range of from about 1 mm to about 10 mm. Such sheets may be wound into a cylinder to form the shape needed for the filter housing.

Alternatively, the HIPE may be poured into a vessel the same shape as the final implement. Molding vessels formed of a material with a high surface energy such as glass, polyester, polycarbonate, or polyurethane are generally found to be suitable, including those vessels line with such surfaces. Molding and suitable methods of producing articles thereby is discussed in greater detail in copending Provisional U.S. patent application Ser. No. 60/163,213, filed in the name of Noel et al., on Nov. 2, 1999 (P&G Case No. 7848P), the disclosure of which is incorporated herein by reference.

3. Treating/Washing HIPE Foam

The polymerized HIPE foam formed will generally be filled with residual water phase material used to prepare the HIPE. This residual water phase material (generally an aqueous solution of electrolyte, residual emulsifier, and polymerization initiator) is generally removed prior to further processing and use of the foam. Removal of this original water phase material will usually be carried out by compressing the foam structure to squeeze out residual liquid and/or by washing the foam structure with water or other aqueous washing solutions. Frequently several compressing and washing steps, e.g., from 2 to 4 cycles, can be used.

4. Foam Dewatering

After the HIPE foam has been treated/washed, it will be dewatered. Dewatering can be achieved by compressing the foam to squeeze out residual water, by subjecting the foam, or the water therein to temperatures of from about 20° to about 90° C. It is preferred that the water temperature exceed the Tg of the polymer by about 20° C. or more. Dewatering may also be effected by microwave treatment, by vacuum dewatering or by a combination of compression and thermal drying/microwave/vacuum dewatering techniques. The dewatering step will generally be carried out until the HIPE foam is ready for use and is as dry as practicable. Frequently such compression dewatered foams will have a water (moisture) content as low as possible, from about 1% to about 15%, more preferably from about 5% to about 10%, by weight on a dry weight basis.

IV. Specific Examples

The following examples illustrate the preparation of HIPE foams useful in the present invention.

EXAMPLE 1

Preparation of Foam from a HIPE

A) HIPE Preparation

The water phase is prepared consisting of 10% calcium chloride (anhydrous) and 0.05% potassium persulfate (initiator).

The oil phase is prepared according to the monomer ratios described in Table 1, all of which include an emulsifier for forming the HIPE. The preferred emulsifier used in these examples is diglycerol monooleate (DGMO) used at a level of 4–8% by weight of oil phase. The DGMO emulsifier (Grindsted Products; Brabrand, Denmark) comprises approximately 81% diglycerol monooleate, 1% other diglycerol monoesters, 3% polyglycerols, and 15% other polyglycerol esters, imparts a minimum oil phase/water phase interfacial tension value of approximately 2.5 dyne/cm and has a critical aggregation concentration of approximately 2.9 wt %.

To form the HIPE, the oil phase is placed in a 3" diameter plastic cup. The water phase is placed in a jacketed addition funnel held at about 50° C. The contents of the plastic cup are stirred using a Cafrano RZR50 stirrer equipped with a six-bladed stirrer rotating at about 300–600 rpm (adjustable by operator as needed). At an addition rate sufficient to add the water phase in a period of about 2 to 5 minutes, the water phase is added to the plastic cup with constant stirring. The cup is moved up and down as needed to stir the HIPE as it forms so as to incorporate all the water phase into the emulsion.

B) Polymerization/Curing of HIPE

The HIPE in the 3" plastic cups are loosely capped and placed in an oven set at 65° C. overnight to cure and provide a polymeric HIPE foam. Wherein volatile monomers such as isoprene are used, the HIPE is formed at a lower temperature, typically between about 0° and 15° C. The cup is kept cold and placed in a pressure vessel which is pressured with external nitrogen or argon gas from a tank to at least about 3 atmospheres of pressure. The pressure vessel is then heated to 65° C. for 48 hours to effect full curing.

C) Foam Washing and Dewatering

The cured HIPE foam is removed from the cup as a cylinder 3" in diameter and about 4" in length. The foam at this point has residual water phase (containing dissolved emulsifiers, electrolyte, initiator residues, and initiator) about 10–100 times the weight of polymerized monomers. The foam is sliced on a meat slicer to give circular pieces about 3 to about 8 mm in thickness. These pieces are washed in distilled water and compressed to remove the water 3 to 4 times. They may be further washed in 2-propanol or ethanol and compressed to expel the alcohol, the process being repeated 3 to 4 times. The pieces are then dried in an oven set at 65° C. for 1 to 2 hours. In some cases, the foams collapse upon drying and must be freeze-dried from the water swollen state to recover fully expanded foams. Various shapes and sizes of foams may be prepared similarly by use of appropriately shaped vessels in which the HIPE is cured and/or appropriate cutting or shaping. The process for preparing the foams of the present invention may also be a continuous one, such as that described in U.S. Pat. No. 5,149,720, issued to DesMarais et al. on Sep. 22, 1992, or copending U.S. patent application Ser. No. 08/370,694, filed in the name of DesMarais on Jan. 10. 1995, the disclosure of each of which is incorporated by reference.

The water-to-oil (W:O) ratios, monomer formulations, and resulting TI values and Tgs are shown in Table 1.

TABLE 1

Foam Composition and Tg.

| Example # | W:O Ratio | STY % | DVB42 % | EHA % | ISO % | TI* | Tg (° C.)** |
|---|---|---|---|---|---|---|---|
| 1a | 13:1 | 20% | 25% | 55% | 0% | 117 | 22° |
| 1b | 13:1 | 26.3% | 16.2% | 57.5% | 0% | 162 | 10° |
| 1c | 15:1 | 20% | 20% | 0% | 60% | 138 | 14° |
| 1d | 20:1 | 25% | 20% | 0% | 55% | 85 | 14° |
| 1e | 15:1 | 24% | 18% | 58% | 0% | 112 | 16° |
| 1f | 15:1 | 22% | 18% | 60% | 0% | 110 | 10° |
| 1g | 15:1 | 10% | 20% | 10% | 60% | 88 | 2° |
| 1h | 15:1 | 0% | 40% | 0% | 60% | 125 | 14° |
| 1i | 13:1 | 18% | 24% | 58% | 0% | 75 | 18° |
| 1j | 20:1 | 23% | 18% | 59% | 0% | 85 | 18° |

*TI = Toughness Index defined above using Tu = 22° C..
**Tg = Glass Transition Temperature measured as defined above at 1.0 radians/second.
STY = styrene; available from Aldrich Chernical Corp.
DVB42 = divinyl benzene, based on 42% purity with 58% ethyl styrene impurity; obtained from Dow Chemical Corp.
EHA = 2-ethylhexyl acrylate; available from Aldrich Chemical Corp.
ISO = isoprene, available from Aldrich Chemical Corp.

EXAMPLE 2

The HIPE foam from Example 1b is fashioned into a sheet 20 cm square and 2 mm thick and impregnated with the following cleaning adjuvants to make a wipe:

commercial furniture wax, Pledge® astringent face wash solution of witch hazel in 2-propanol antimicrobial solution of didecyldimethyl ammonium chloride in ethanol insect repellent solution of diethyl-m-toluamide in ethanol commercial cleaning solution, Cinch® cleaning solution comprising 5% sodium lauryl sulfate in water a 2.5% acetic solution in water commercial car wax commercial brass polishing solution, Brasso®

EXAMPLE 3

The HIPE foam from Example 1g is further modified by inclusion of a microwave susceptor aluminum powder introduced into the emulsion prior to curing. The remainder of the process is unchanged. The material is cut into 2 mm thick sheets and laminated onto a paper backing formed into a tray shape. Frozen meat can be placed on the tray in contact with the HIPE foam and subjected to microwave radiation from a microwave oven. The susceptor particles convert the microwaves to thermal energy and aid in thawing and browning the meat without overcooking or making it intolerably tough.

The disclosures of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the present invention have been illustrated and described, it would be obvious to those skilled in the art that various other changes and modifications can be made without departing from the spirit and scope of the invention.

What is claimed is:

1. An implement comprising a HIPE foam containing a hydrophobia polymer having:

A. a dry density of less than about 100 mg/cc;

B. a glass transition temperature (Tg) of between about −40° and about 90° C.; and C. a toughness index of at least about 75 wherein said foam comprises a vinyl polymer and said implement is selected from the group consisting of implements having a substantially two-dimensional structure and those implements having substantially a tridimensional structure.

2. An implement according to claim 1 wherein said HIPE foam has:

A) a specific surface area per foam volume of at least about 0.01 m$^2$/cc; and

B) a glass transition temperature (Tg) of between about −40° and 50° C.

3. An implement according to claim 2 wherein said HIPE foam has:

A) a dry density of less than about 80 mg/cc; and

B) a glass transition temperature (Tg) of between about −20° and 20° C.

4. An implement according to claim 2 wherein said HIPE foam has:

A) a dry density of less than about 80 mg/cc; and

B) a mean cell size between about 10 μm and about 130 μm.

5. An implement according to claim 1 wherein the HIPE foam has a substantially two dimensional structure.

6. An implement according to claim 1 wherein the HIPE foam has a substantially three dimensional structure.

7. An implement according to claim 1 wherein the implement is selected from the group consisting of wipes, toys, stamps, art media, targets, food preparation implements, plant care implements, and medical wraps.

* * * * *

UNITED STATES PATENT AND TRADEMARK OFFICE
CERTIFICATE OF CORRECTION

PATENT NO. : 6,376,565 B1
DATED : April 23, 2002
INVENTOR(S) : Dyer et al.

It is certified that error appears in the above-identified patent and that said Letters Patent is hereby corrected as shown below:

Column 10,
Line 16, "it" should read -- at --.

Column 14,
Line 5, "cross-inking" should read -- cross-linking --.

Column 19,
Footnote to Table 1 beginning with the word STY, "Chernical" should read -- Chemical --.

Column 20,
Line 64, "hydrophobia" should read -- hydrophobic --.

Signed and Sealed this

Twenty-third Day of July, 2002

Attest:

*Attesting Officer*

JAMES E. ROGAN
*Director of the United States Patent and Trademark Office*